(12) United States Patent
Jubinville et al.

(10) Patent No.: US 9,497,929 B2
(45) Date of Patent: Nov. 22, 2016

(54) ANIMAL FEEDER HAVING A RETRACTABLE FEEDING SURFACE

(71) Applicants: Leonard Jubinville, Sturgeon County (CA); Gisele Jubinville, Sturgeon County (CA)

(72) Inventors: Leonard Jubinville, Sturgeon County (CA); Gisele Jubinville, Sturgeon County (CA)

(*) Notice: Subject to any disclaimer, the term of this patent is extended or adjusted under 35 U.S.C. 154(b) by 0 days.

(21) Appl. No.: 14/781,065

(22) PCT Filed: Mar. 4, 2014

(86) PCT No.: PCT/CA2014/050165
§ 371 (c)(1),
(2) Date: Sep. 29, 2015

(87) PCT Pub. No.: WO2014/165980
PCT Pub. Date: Oct. 16, 2014

(65) Prior Publication Data
US 2016/0044893 A1 Feb. 18, 2016

(30) Foreign Application Priority Data
Apr. 8, 2013 (CA) .................................... 2812103

(51) Int. Cl.
*A01K 5/01* (2006.01)
*A01K 5/02* (2006.01)
*A01K 1/10* (2006.01)

(52) U.S. Cl.
CPC . *A01K 5/02* (2013.01); *A01K 1/10* (2013.01); *A01K 1/105* (2013.01); *A01K 5/01* (2013.01)

(58) Field of Classification Search
CPC ............ A01K 5/01; A01K 1/10; A01K 39/014
USPC ........ 119/60, 61.3, 58, 61.2, 61.1, 59, 57.92, 119/52.3, 61.31
See application file for complete search history.

(56) References Cited
U.S. PATENT DOCUMENTS

| 727,925 | A | * | 5/1903 | Faulkner | A01K 5/01 119/58 |
| 763,951 | A | * | 7/1904 | Bethea | A01K 39/014 119/60 |
| 3,388,677 | A | * | 6/1968 | MacKay | A47F 1/06 108/136 |
| 4,294,197 | A | * | 10/1981 | Snel | A01K 5/01 119/60 |
| 4,976,222 | A | * | 12/1990 | Cooke | A01K 5/01 119/60 |
| 5,000,122 | A | * | 3/1991 | Smith | A01K 5/01 119/58 |
| 7,895,974 | B2 | * | 3/2011 | Brickell | A01K 1/10 119/60 |

* cited by examiner

*Primary Examiner* — Yvonne Abbott-Lewis
(74) *Attorney, Agent, or Firm* — Davis & Bujold PLLC; Michael J. Bujold

(57) ABSTRACT

A feeder for animals has an enclosure that receives feed material. The enclosure has at least one vertical feed surface that retains the feed material and provides access to animals to the feed material. The vertical feed surface is movable in a horizontal direction. A biasing device is attached to the vertical feed surface. The biasing device moves the vertical feed surface horizontally as the feed material is depleted within the enclosure.

11 Claims, 4 Drawing Sheets

ANIMAL FEEDER HAVING A RETRACTABLE FEEDING SURFACE

TECHNICAL FIELD

This relates to an animal feeder having a retractable feeding surface.

BACKGROUND

Feeders are used to hold feed material, often in the form of a bale, which is intended for animals, generally livestock, such as cows, horses, goats, sheep, deer, and the like. Feeders are often designed to protect the feed from being fouled or wasted and to protect the feed from the elements.

SUMMARY

There is provided a feeder for animals, comprising an enclosure that receives feed material. The enclosure has at least one vertical feed surface that retains the feed material and provides animals access to the feed material. The vertical feed surface is movable in a horizontal direction. A biasing device is attached to the vertical feed surface. The biasing device moves the vertical feed surface horizontally as the feed material is depleted within the enclosure.

According to an aspect, the enclosure may comprise two vertical feed surfaces on opposed sides of the enclosure.

According to an aspect, the vertical feed surface may comprise one or more of a mesh and vertical or horizontal bars.

According to an aspect, the biasing device may comprise a roller that rolls up the vertical feed surface as the feed material is depicted and the vertical feed surface is flexible in at least the direction of rotation of the roller. The roller of the biasing device may be biased by a spring or by a counterweight. The roller may be mounted to the side or to the top of the enclosure to roll up the vertical feed surface in either direction.

According to an aspect, the biasing device may comprise a horizontal track and a spring member that biases the feed surface along the track.

According to an aspect, the biasing device may comprise a horizontal track and a counterweight that biases the feed surface along the track.

According to an aspect, the biasing device may be biased by at least one of a counterweight, a mechanical spring, a pneumatic spring, a hydraulic or pneumatic cylinder, and a mechanical actuator.

According to an aspect, the biasing device may comprise a ratchet surface that permits movement of the vertical feed surface toward the feed material and prevents movement of the vertical feed surface away from the feed material. The ratchet surface may be engaged by a pivoting, locking bar that allows the ratchet to move in one direction and prevents movement in an opposed direction.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
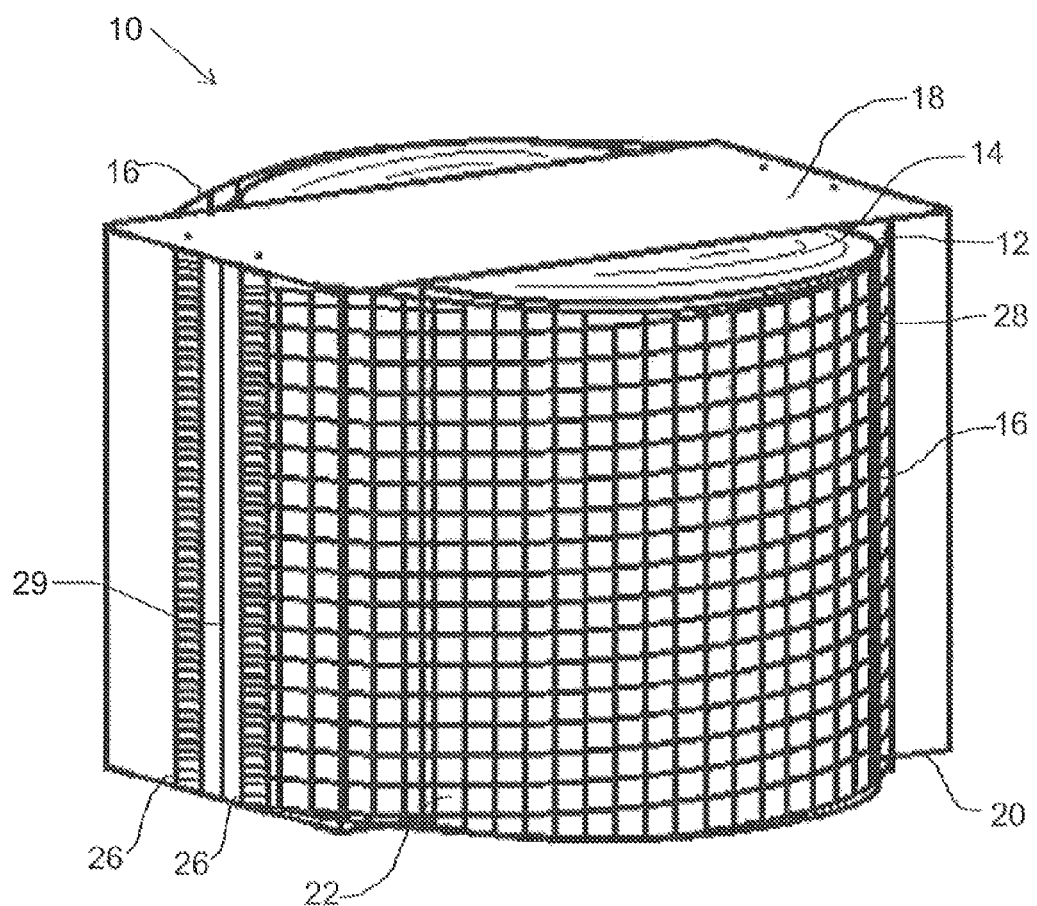
FIG. 1 is a perspective view of a feeder with rollers that retract a mesh.

A feeder generally identified by reference numeral 10, will now be described with reference to FIG. 1 through 8.

Figure 7:
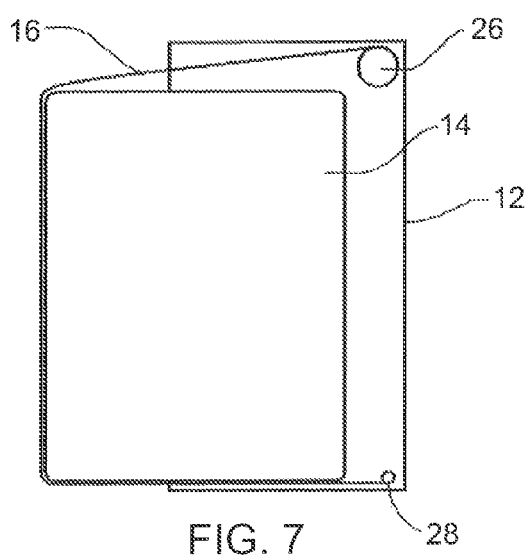
FIGS. 7 and 8 are side elevation views of the alternative feeder of FIG. 6.

Referring to FIG. 1, feeder 10 has an enclosure 12 that receives feed material 14, As shown, feed material 14 is a round bale of fibrous material, such as hay. However, it will be understood that feed material 14 may be any known feed that may be enclosed by enclosure 12 as will be described below, and that is suitable feed for animals, generally livestock or ruminant animals such as cows, horses, deer, elk, goats, sheep and the like. Depending on the design of the vertical feed surface as will be described below, the design may not be suitable for animals with antlers. Examples of other feed material may include square bales or loose material. Enclosure 12 has at least one vertical feed surface 16 that provides access to animals to feed material 14. Enclosure 12 is made up of one or more vertical surfaces that surround feed material 14, one of which, or a part of which, is vertical feed surface 16. Preferably, enclosure 12 restricts access to feed material 14 such that it is only accessible by vertical feed surface 16, As shown, there are two feed surfaces 16, although enclosure 12 may be designed with a single feed surface 16, such as shown in FIG. 7. Enclosure 12 preferably has a top covering 18 to protect feed material 14 from the elements, and a bottom surface 20 underlying feed material 14. As shown, top covering 18 and bottom surface 20 are also used to provide structural support for enclosure 12, although structural support may be provided in other ways. Top covering 18 may cover only a portion of the feed as shown in FIG. 1, or may be wide enough to cover all of feed material 14. If top covering 18 is not wide enough, movable flaps, either rigid or flexible material, may be provided to increase the width of top covering 18. This may be used to maintain a more narrow structure to make shipping and handling easier and more feasible. Top covering 18 may be removable or openable to provide improved access to enclosure 12.

Enclosure 12 may he modified to accommodate the habits or characteristics of certain animals. For example, enclosure 12 may be height adjustable, or supported on a support structure (not shown) to be at a certain height. In addition, bottom surface 20 may have extensions (not shown) that extend outward, which may be useful for animals such as goats that climb to eat.

Figure 2:
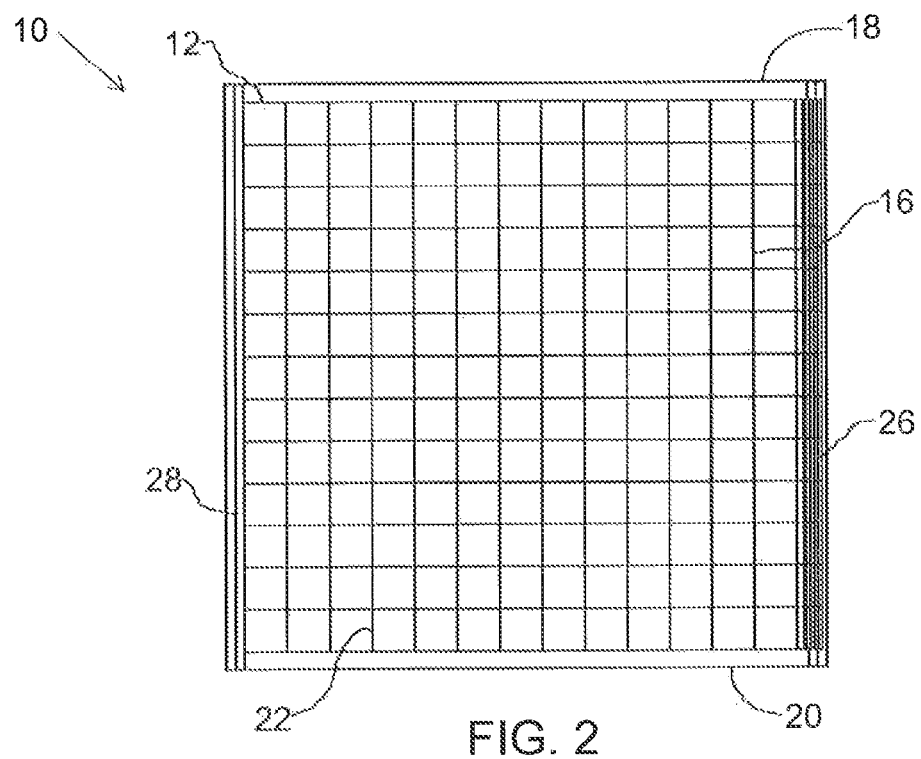
FIG. 2 is a front elevation view of the feeder of FIG. 1.
Figure 3:
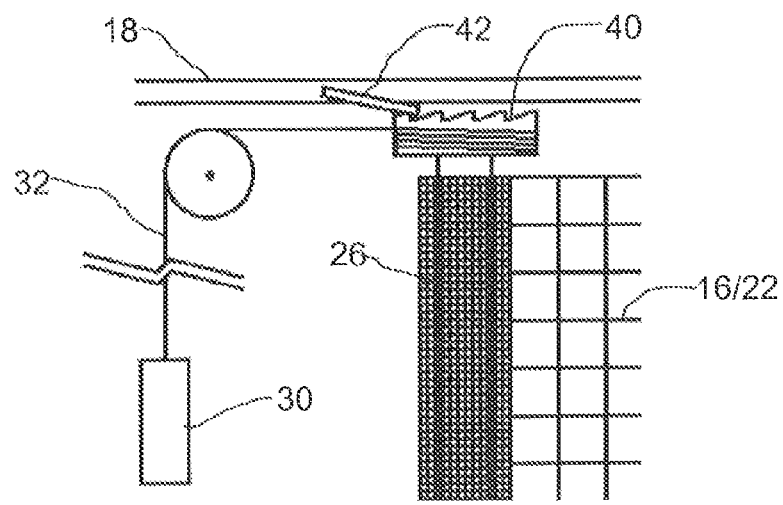
FIG. 3 is a detailed side elevation view of a biasing device.
Figure 4:
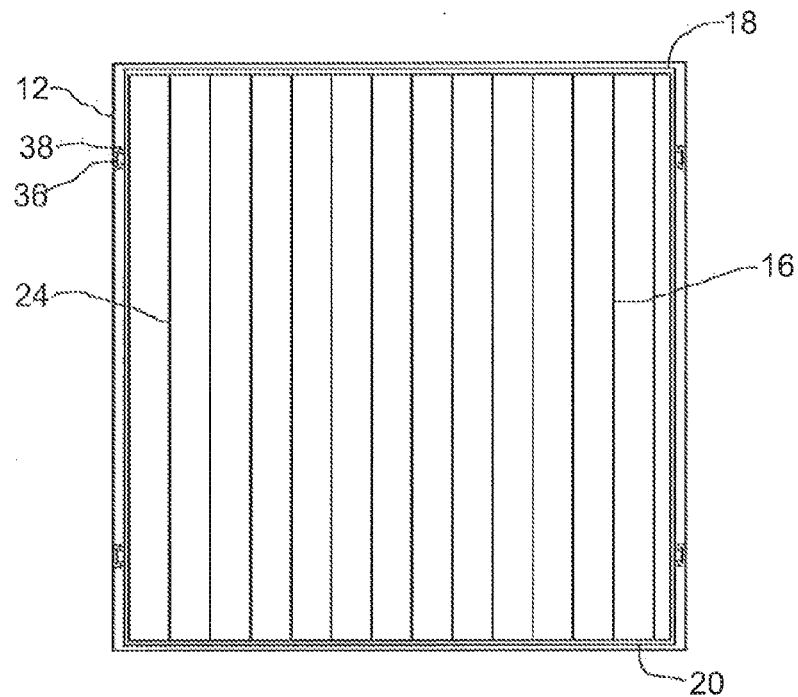
FIG. 4 is a front elevation view of an alternative feeder.
Figure 5:
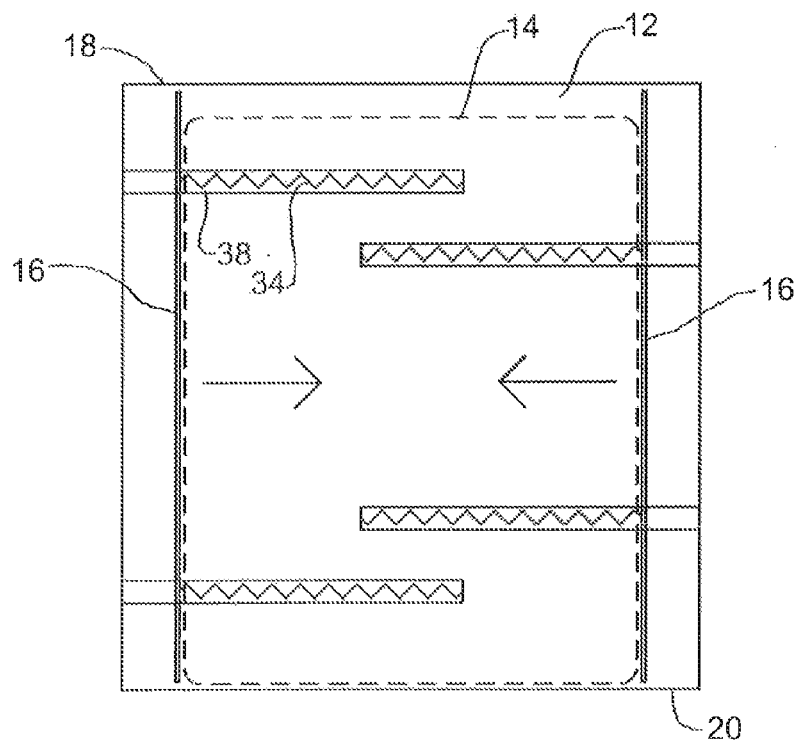
FIG. 5 is a side elevation view of the alternative feeder of FIG. 4.

Vertical feed surface 16 retains feed material 14 and has openings that provide animals access to feed material 14 in enclosure 12. Referring to FIG. 1, vertical feed surface 16 is preferably a flexible mesh 22 as it has been found that a mesh is better for ruminant animals. A flexible structure allows the vertical feed surface 16 to conform better to the enclosed feed material 12. However, vertical feed surface 16 may take various forms, such as a rigid mesh or, as shown in FIG. 4, a rigid set of bars 24, or a combination of these features. For example, if vertical feed surface 16 is rolled up as shown in FIG. 1-3, rigid vertical bars may be provided that are connected by flexible connectors that allow it to be retracted onto a rotating support. Alternatively, if vertical feed surface 16 is a wall that is retracted as shown in FIGS. 4 and 5, a rigid frame may be used with a flexible mesh mounted within. In another example, vertical bars may be attached to mesh 22 in order to keep it taut. This prevents mesh 22 from sagging at the top, and also prevents smaller animals from lifting the bottom of mesh 22. If mesh 22 is rolled up horizontally (as shown in FIG. 5), horizontal bars may be used for the same purpose. Other structures that permit the same results may also be used. It will be understood that, as vertical feed surface 16 conforms to feed material 14, it may not he exactly vertical at all times, as the actual surface may vary depending on the rate at which feed material 14 is consumed at different heights as well as the structure of vertical feed surface 16.

Figure 6:
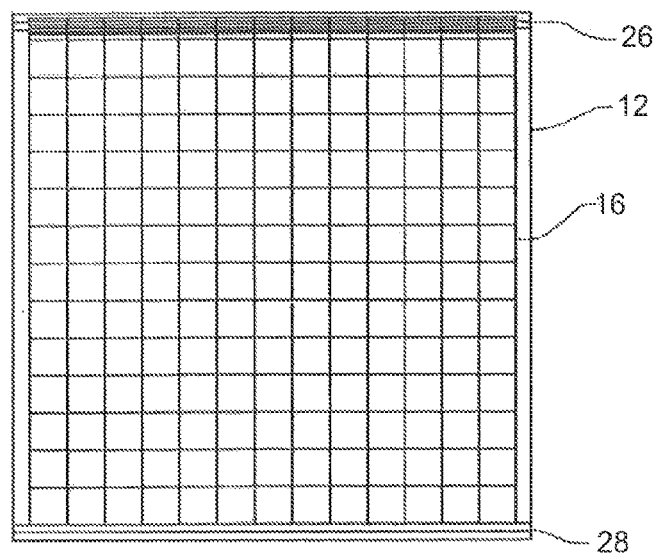
FIG. 6 is a front elevation view of a further alternative feeder.
Figure 8:
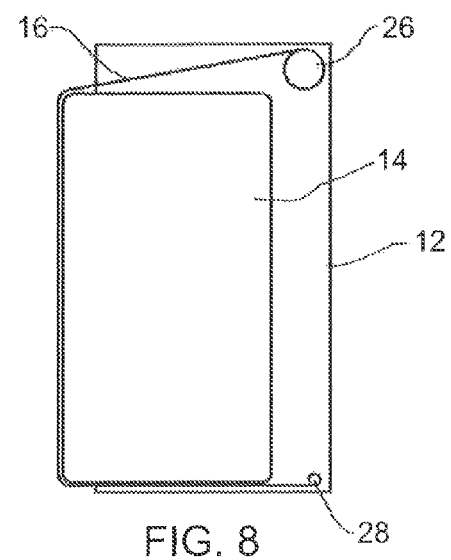

Vertical feed surface 16 moves in a horizontal direction such that the movement of vertical feed surface 16 is parallel to the ground surfaces. As vertical feed surface 16 is retracted by a biasing device, the movement is preferably completely horizontal without any vertical component. Referring to FIG. 1-3, vertical feed surface 16 may he retracted by a roller 26, which pulls vertical feed surface 16 back as it rotates. Rollers 26 are shown as being on the same side, but may also be positioned on opposite sides. In the depicted example, there is a fixed vertical support 28 opposite roller 26. Fixed vertical support 28 holds one side of mesh 22 while roller 26 rolls up mesh 22. As support 28 and roller 26 are in a fixed position, mesh 22 is instead pushed out by feed material 14, which is then retracted and pulled close against feed material 14 as roller 26 turns. Feed material 14 is installed by removing one or both of support 28 and roller 26, placing feed material 14 within enclosure 12, and replacing vertical feed surface 16 by reinstalling support 28 and/or roller 26. There may also be one or more additional bars 29 that prevent feed material 14 from contacting and interfering with rollers 26 and support bar 28. The biasing device is also properly arranged at this point. Another example involving roller 26 is shown in FIG. 6-8. In this example, roller 26 is placed horizontally and pulls vertical feed surface 16 back as feed material 14 is consumed from the position in FIG. 7 to the position in FIG. 8, and beyond. This is also an example of a feeder 10 that has access from a single side. It will be understood that any of the depicted examples may be modified to provide access from one or both sides. The examples in FIGS. 1-3 and 6-8 relate to a rotating actuator. As shown in FIG. 3, roller 26 turns as a result of a counterweight 30 that hangs from a line 32 that is wrapped around the top of roller 26. Counterweight 30 provides the necessary biasing force to maintain vertical feed surface 16 against feed material 14. When feed material 14 is installed, counter weight 30 is in a raised position, and line 32 is wrapped around roller 26.

Referring to FIGS. 4 and 5, an example of a linear actuator is shown, in which a spring 34 pulls back on a grid of bars 24, which has rollers 36 mounting it to a horizontal track 38. As feed material 14 is consumed, spring 34 urges bats 24 back against it until a fully retracted position is reached. Again, a feed surface 16 is shown on either side of enclosure 12, although only one may be used.

It will be understood that, while the rotating actuator is shown with a counterweight and the linear actuator is shown with a spring member, either of these examples may be modified to use either a spring or a counterweight. Furthermore, biasing forces may be applied in other ways, such as with bands of elasticized material, pneumatic springs, hydraulic or pneumatic cylinders, mechanical actuators, etc. some of which may be controlled using sensors and logic controllers. However, it is preferable to keep feeder 10 simple to avoid the need for power and to allow for easy repairs, if necessary.

The feeder of claim 1, wherein the vertical feed surface is flexible in at least one direction and the biasing device comprises a roller that rolls up the vertical feed surface as the feed material is depleted.

Referring again to FIG. 3, the biasing device preferably includes a ratchet surface 40 that permits movement of vertical feed surface 16 toward feed material 14 and prevents movement of vertical feed surface 16 away from feed material 14. As shown, ratchet surface 40 is at the top of roller 26 and is engaged by a pivoting bar 42, which moves to allow retracting movement but does not allow vertical feed surface 16 to move away from feed material 14 unless it is manually opened. Various types of ratchets will be known to those skilled in the art and may depend on the type of biasing system used and the manner in which vertical feed surface 16 is retracted.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can he obviously substituted. The scope of the claims should not be limited by the preferred embodiments set forth in the examples above.

What is claimed is:

1. A feeder for animals, comprising:
   an enclosure that receives feed material, the enclosure having at least one vertical feed surface, the vertical feed surface retaining the feed material and having openings that provide animals access to the feed material in the enclosure, the vertical feed surface being movable in a horizontal direction;
   a biasing device attached to the vertical feed surface, the biasing device moving the vertical feed surface horizontally as the feed material is depleted within the enclosure.

2. The feeder of claim 1, wherein the enclosure comprises two vertical feed surfaces on opposed sides of the enclosure.

3. The feeder of claim 1, wherein the vertical feed surface comprises at least one of a mesh, vertical bars, horizontal bars, chains, or combinations thereof.

4. The feeder of claim 1, wherein the biasing device comprises a roller that rolls up the vertical feed surface as the feed material is depleted and the vertical feed surface is flexible in at least the direction of rotation of the roller.

5. The feeder of claim 4, wherein the roller of the biasing device is biased by a spring.

6. The feeder of claim 4, wherein the roller of the biasing device is biased by a counterweight.

7. The feeder of claim 1, wherein the biasing device comprises a horizontal track and a spring member that biases the feed surface along the track.

8. The feeder of claim 1, wherein the biasing device comprises a horizontal track and a counterweight that biases the feed surface along the track.

9. The feeder of claim 1, wherein the biasing device is biased by at least one of a counterweight, a hand of elasticized material, a mechanical spring, a pneumatic spring, a hydraulic or pneumatic cylinder, and a mechanical actuator.

10. The feeder of claim 1, wherein the biasing device comprises a ratchet surface that permits movement of the vertical feed surface toward the feed material and prevents movement of the vertical feed surface away from the feed material.

11. The feeder of claim 10, wherein the ratchet surface is engaged by a pivoting bar that allows the ratchet to move in one direction and prevents movement in an opposed direction.

* * * * *